United States Patent [19]

Achelpohl

[11] 4,235,659

[45] Nov. 25, 1980

[54] APPARATUS FOR MAKING AND STACKING PLASTICS BAGS

[75] Inventor: Fritz Achelpohl, Lengerich, Fed. Rep. of Germany

[73] Assignee: Windmoller & Holscher, Lengerich, Fed. Rep. of Germany

[21] Appl. No.: 60,237

[22] Filed: Jul. 24, 1979

[30] Foreign Application Priority Data

Jul. 28, 1978 [DE] Fed. Rep. of Germany ....... 2833236

[51] Int. Cl.[2] ........................ B32B 31/00; B30B 15/34

[52] U.S. Cl. .................................. 156/510; 152/583.1

[58] Field of Search ............... 156/250, 251, 290, 510, 156/515, 583.1

[56] References Cited

U.S. PATENT DOCUMENTS

| | | | |
|---|---|---|---|
| 3,917,505 | 11/1975 | Schulze | 156/515 |
| 4,021,291 | 5/1977 | Joice | 156/515 |
| 4,083,747 | 4/1978 | Rochla | 156/515 |

*Primary Examiner*—Douglas J. Drummond

*Attorney, Agent, or Firm*—Fleit & Jacobson

[57] ABSTRACT

In a bag-making machine, a flattened tubular plastics web is intermittently fed by rollers and the leading end is held taut by air jets from tubes above and below the web. Welding jaws apply base seams for bag sections successively severed from the leading web end by knives. Between the knives and a stacking conveyor for the bag sections there is a supporting plate for the bag sections co-operating with a depressor. Two rows of needles pass alternately through slots in the supporting plate into a raised spiking position. Upon completion of a stack, the needles of one row are moved by a carrier to push the stack closer to the conveyor while the latter is moving and are eventually retracted from the stack while the needles of the other row take their place by moving into the spiking position for the next stack of bag sections.

8 Claims, 3 Drawing Figures

APPARATUS FOR MAKING AND STACKING PLASTICS BAGS

The invention relates to an apparatus for making plastics bags from an intermittently fed flattened web of tubular film and for stacking same, comprising air jet pipes which stretch the leading fed end of the web of tubular film and are disposed at both sides thereof, cyclically operating transverse welding and transverse severing means which provide the bags with base weld seams and cut them from the web of tubular film, a row of needles behind the transverse severing means in the feeding direction of the tublar web of film, a raisable and lowerable depressor which is disposed above the row of needles and pushes the bag that has last been severed from the web of tubular film onto the needles in the vicinity of its mouth, means for pushing the bags off the needles after forming a stack of predetermined number, a conveyor belt supporting the bags during stacking and intermittently taking the finished stacks away, and a pressure element disposed above the conveyor belt and lowerable onto and raisable from the stacks.

Since the floppy leading end of the tubular web of film has to be pushed through the transverse welding and severing tools for the purpose of applying the transverse weld seams and the transverse cuts and it has to be deposited in a stretched form onto the support carrying the stack or onto the workpieces already stacked thereon, blow nozzles are usually provided at both sides of the tubular web of film in front of the last conveyor rollers which feed the tubular web of film, the nozzles producing an air jet which releases the front edge of the tubular web of film if this is still adhering to the welding jaws and carries the leading end of the tubular web of film forwards in a stretched form by one bag length. Since the strong air jet is directed towards the growing stack of bags and the stacks which are already finished and intermittently taken away, there is a danger that it will lift bags from the stacks and disrupt the latter.

To prevent the air jet from blowing apart the stacks that have just been formed, an apparatus of the aforementioned kind known from DE-OS 25 57 819 provides a raisable and lowerable plate which serves as a protective wall transversely to the feeding direction of the tubular web of film and abuts the rear end of the last stack of bags to be formed, covers same and is raised for the purpose of taking the stack away. In the known apparatus, it is not only necessary to provide expensive equipment for controlling the cover plate but it is also necessary to stop the intermittent feeding of the tubular web of film during the period in which a stack with the predetermined number of bags is lifted off the fixed needles by a pusher and, by means of switching the conveyor belt on, has been removed so far that the cover plate can be deposited behind its trailing end. Only after the stack has been taken away, the cover plate lowered and the slide for lifting the stack from the needles returned can the feed for the tubular web of film be switched on again to form the next stack of bags. The output of the known machine is reduced because after forming each stack of bags the cyclic production of the bags must be temporarily interrupted.

It is the problem of the present invention to provide an apparatus of the aforementioned kind in which the last stack to be formed can be moved out of the stacking station in the sequence of bag production without the need for interrupting the production and without special features for protecting the last stack to be formed from the air jet.

According to the invention, this problem is solved in that two rows of needles interspersed in comb-like manner are provided that engage through elongate holes in a supporting plate bridging the gap between the severing means and the conveyor belt and are secured to carriers which are disposed beneath the supporting plate, are provided with drives and, after one stack has been spiked, alternately move one row from its spiking position projecting beyond the supporting plate to a position advanced towards the conveyor belt and, prior to or upon commencement of the advancing motion, retract the other row, which is in the advanced position, out of the stack under the supporting plate and, during the advancing cycle, move it to the spiking position, and that the belt drive is switched on during the advancing motion of the respective row of needles. In the apparatus according to the invention, the last stack to be spiked can, in the sequence of bag production, be pushed out of the stacking station by the row of needles holding same with simultaneous switching on of the belt drive during feeding of the tubular web of film, and at the same time the other row of needles can be moved to its spiking position so that the next following bag is spiked thereon as the first of the next stack to be formed. The air jet passing over the stacks of bags cannot disrupt the stacks because the front edge of the last stack to be pushed out is still spiked on a row of needles and held together thereby. Nor will the air jet tend to open up the last stack to be pushed away if the row of needles holding same is pulled out before the next following stack is pushed away because its front edge that could form an impingement surface for the air jet is covered in overlapping formation by the bags of the next following stack. Special means protecting the front edge of the last stack to be formed from the air jet can therefore be dispensed with. The apparatus of the invention is further characterised by a high output because the cyclic production of bags need not be interrupted while a finished stack is being discharged.

Desirably, the supporting plate is flanged to Z shape, the needles being in the spiking position on the upper horizontal portion of the supporting plate and in the pushed-away position on the lower horizontal portion. This manner of stepping the supporting plate has the advantage that the stack just being formed lies substantially horizontally on the upper portion of the supporting plate and the stack that has been pushed off so that resistances can be avoided in the vicinity of the stacking station that might cause eddying in the air jet.

In a further development of the invention, a flanged plate between the front edge of the stack and the row of needles in the spiking position has its upper horizontal portion projecting beyond the front edge of the stack. The depressor is lowered closely in front of the front edge of the flanged plate so that it will each time push that edge of the last bag to be severed from the tubular web of film which projects beyond the row of needles to lie under the horizontal upper web of the flanged plate. By means of this flanged plate the front edge of the stack being formed and suspended from the row of needles is also protected from the air jet.

In a further development of the invention, a carriage movable in guides disposed parallel to the conveyor belt carries a pressure bar raisable from and lowerable onto the conveyor belt. The pressure bar is applied to the rear end of the stack of bags hanging from the row of needles that has been pushed away and presses same against the conveyor belt, possibly by way of the preceding stack of bags that it overlaps. By means of the frictional contact thus produced, the carriage is at the same time coupled to the conveyor belt so that it will move therewith after the belt drive has been switched on. The conveyor belt can be intermittently advanced to such an extent that the stacks of bags lie on it side-by-side or overlap one another. Since the pressure bar always clamps the last stack of bags to have been pushed off against the conveyor belt, the stack can be pulled out from beneath the last stack to be formed, by which it is overlapped, without the danger of displacing the bags.

A rotatably mounted pressure cylinder lowerable onto the stacks of bags lying on the conveyor belt is also known from DE-OS 25 57 819. However, this is stationary and provided with a special drive which always accelerates it to the same speed as the conveyor belt.

Other advantageous embodiments of the invention have been described in the subsidiary claims.

One example of the invention will now be described in more detail with reference to the drawing, wherein.

Figure 1:
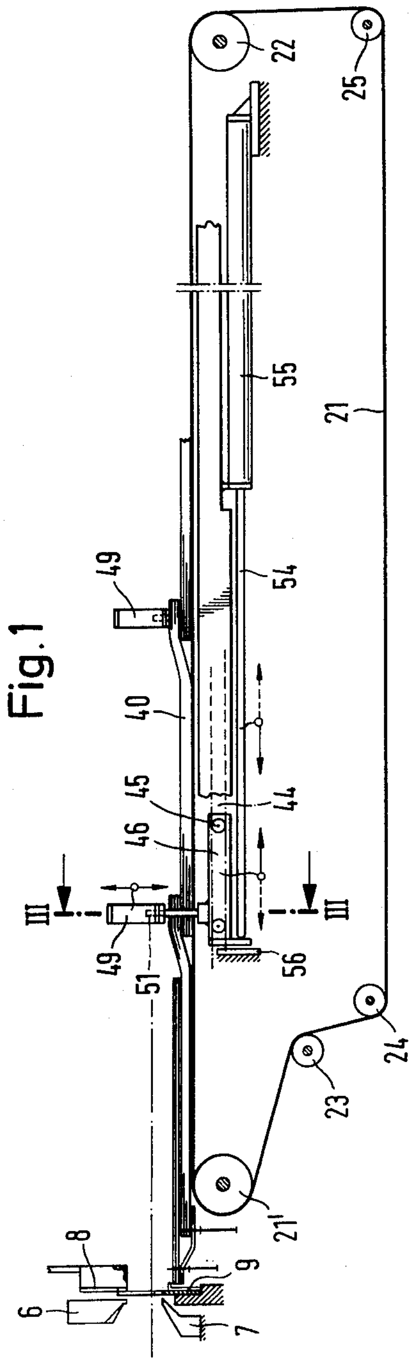
FIG. 1 is a diagrammatic side elevation of the apparatus for making and stacking plastics bags.
Figure 3:
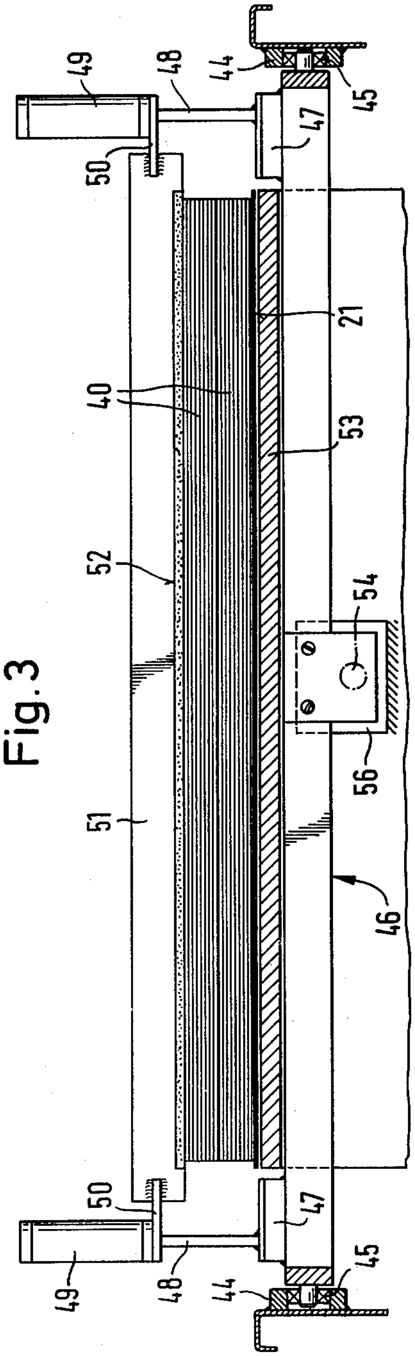
FIG. 3 is a section through the apparatus on the line III—III in FIG. 1.
Figure 2:
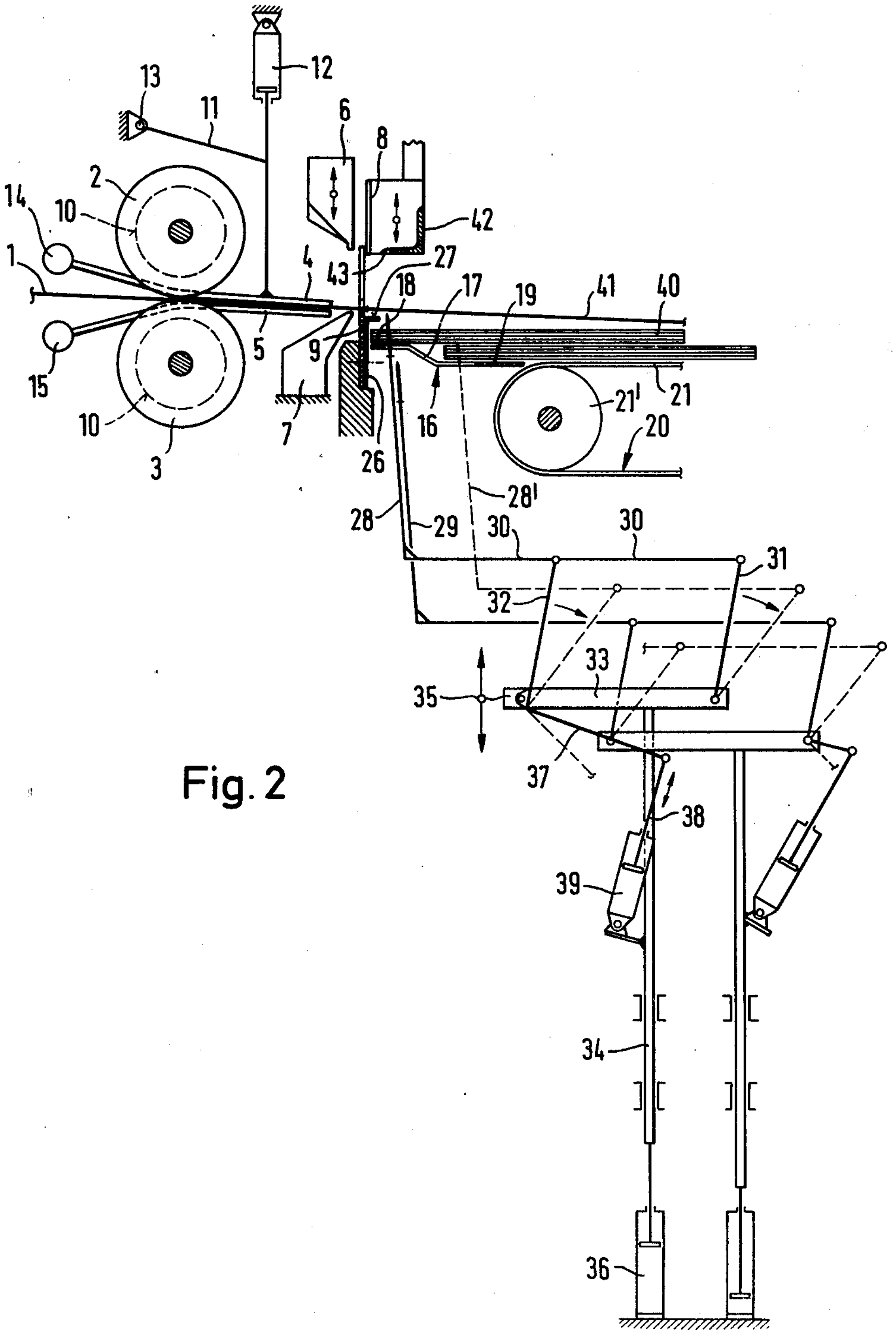
FIG. 2 shows the spiking means to a larger scale.

For intermittently feeding the tubular web 1 of plastics film, which may also be provided with side folds, there is a pair of feed rollers 2, 3 provided with circumferential grooves of which the base is indicated by the broken line 10 and in which rows of air jet pipes 4, 5 engage in a comb-like manner. The tubular web of film is passed between the air jet pipes 4, 5 so that the leading end of the tubular web fed by the pair of feed rollers 2, 3 is carried through by the air jet in a stretched form between the open welding jaws 6, 7 and the upper and lower knives 8, 9 of the cutting tool by one bag length.

The air jet tubes 4, 5 arranged in rows in a comb-like manner are secured to a lever 11 which is pivoted to the machine frame by the pivot 13. A pneumatic piston-cylinder unit 12 is provided to pivot the air jet pipes. The jet pipes 4, 5 are connected to air supply tubes 14, 15. While the welding jaws 6, 7 are closed to form the base weld seam, the air jet pipes 4, 5 are in a lowered position. To release the leading end of the tubular web 1 of film from the welding jaw 7 and for pushing the leading end of the tubular web of film through, the air jet pipes 4, 5 are raised by a suitable distance.

A Z-shaped supporting plate 16 arranged between the belt conveyor 20 and the lower knife 9 is provided with parallel elongate holes 17 extending from the upper horizontal portion 18 up to the lower horizontal portion 19 of the supporting plate 16.

The belt 21 of the belt conveyor 20 passes over direction-changing and driving drums 21', 22 and guide rollers 23–25.

Screwed to the lower knife 9 there is a flanged plate 26 of which the upper horizontal limb 27 is disposed above the horizontal portion 18 of the supporting plate 16.

Needles 28, 29 interspersed in a comb-like manner and arranged in parallel rows engage through the elongate holes 17 of the supporting plate 16. The row of needles 28 is secured on the carrier 30 which is hinged to the supporting member 33 by parallel links 31, 32. The supporting member 33 is secured to the bar 34 mounted in the machine frame and can be reciprocated in the direction of the double arrow 35 by the piston-cylinder unit 36. In the vicinity of the lower hinge, the link 32 is connected to a lever 37 of which the end is pivoted to the piston rod 38 of the piston-cylinder unit 39 which is hinged to the bar 34.

The needles 29 passing through the needles 28 are analogously secured and mounted and provided with corresponding drives and need therefore not be described.

The needle 28 is in its spiking position in the position shown in full lines. In this position, the stack 40 of bags is spiked thereon in that the bag 41 is severed from the fed tubular web 1 of film and pushed onto the row of needles 28. To sever the bags 41 from the tubular web 1 of film, the upper knife 8 of the cutting tool is lowered together with or shortly after the upper jaw 6 of the welding tool, the depressor 42 consisting of an angle iron pushing the mouth of the bags onto the needles 28. The depressor 42 is provided with recesses 43 with which it passes through the rows of needles 28, 29. The depressor 42 moves down just in front of the front edge of the flanged web 27 so that it pushes the edge of the bags 41 projecting beyond the needle rows under the web 27.

By way of ball bearings 45, a carriage 46 is freely longitudinally displaceable in lateral fixed guides 44 parallel to the conveyor belt 21. The carriage 46 is provided with lateral supporting members 47 to which the piston rods 48 of piston-cylinder units 49 are secured. By way of cross-members 50, the cylinders are secured to pressure bars 51 provided with pressure edges 52 of elastomeric material. The carriage 46 is provided with a backing bar 53. The conveyor belt 21 passes between the pressure bar 52 and backing bar 53. The guides 44 are provided with abutments of which the abutment 56 shown in FIG. 1 limits the foremost position of the carriage 46. The carriage 46 moved out of its foremost position can be advanced to in front of the abutment 56 by the piston rod 54 of the piston-cylinder unit 55 fixed to the frame.

The pressure bar 51 is, in the left-hand position of the carriage 46 shown in FIG. 1, applied to the rear end of the stack of bags that has been pushed off and the front end of which is still fixed to the needles. The pressure bar 51 holds the stack of bags in frictional engagement with the conveyor belt 21 so that the carriage 46 is moved to the right-hand position in FIG. 1 together with the conveyor belt 21 as soon as the belt drive has been switched on intermittently. After lifting the pressure bar, the carriage is, by means of the piston rod 54 which abuts the abutment 56' secured to the carriage, again move to the left-hand limiting position in which the pressure bar is lowered onto the rear end of the stack of bags that has been pushed away.

The depressor 42 is resiliently connected to its carrier in a manner not shown so that it will adapt itself to the current height of the stack.

I claim:

1. Apparatus for making plastics bags from an intermittently fed flattened web of tubular film and for stacking same, comprising air jet pipes which stretch the leading fed end of the web of tubular film and are disposed at both sides thereof, cyclically operating transverse welding and transverse severing means which provide the bags with base weld seams and cut them from the web of tubular film, a row of needles behind the transverse severing means in the feeding direction of the tubular web of film, a raisable and lowerable depressor which is disposed above the row of needles and pushes the bag that has last been severed from the web of tubular film onto the needles in the vicinity of its mouth, means for pushing the bags off the needles after forming a stack of predetermined number, and a conveyor belt supporting the bags during stacking and intermittently taking the finished stacks away, characterised in that two rows of needles (28, 29) interspersed in comb-like manner are provided that engage through elongate holes (17) in a supporting plate (16) bridging the gap between the severing means (8, 9) and the conveyor belt (20) and are secured to carriers (30) which are disposed beneath the supporting plate, are provided with drives (36, 39) and alternately move one row from its spiking position projecting beyond the supporting plate (16) to a position advanced towards the conveyor belt (20) and, prior to or upon commencement of the advancing motion, retract the other row, which is in the advanced position, out of the stack under the supporting plate (16) and, during the advancing cycle, move it to the spiking position, and that the belt drive is switched on during the advancing motion of the respective row of needles.

2. Apparatus according to claim 1, characterised in that the supporting plate (16) is flanged to Z shape, the needles (28, 29) being in the spiking position on the upper horizontal portion (18) of the supporting plate and in the pushed-away position on the lower horizontal portion (19).

3. Apparatus according to claim 1 or claim 2, characterised in that a flanged plate (26) between the front edge of the stack and the row of needles in the spiking position has its upper horizontal portion (27) projecting beyond the front edge of the stack.

4. Apparatus according to one of claims 1 to 3, characterised in that a carriage (46) movable in guides (44) disposed parallel to the conveyor belt carriers a pressure bar (51) raisable from and lowerable onto the conveyor belt (21).

5. Apparatus according to one of claims 1 to 4, characterised in that the carriage (46) is freely movable in its guides (44), and a pneumatic piston-cylinder unit (55) is provided to return the carriage against the conveying direction of the conveyor belt (20).

6. Apparatus according to one of claims 1 to 5, characterised in that the carriage (46) is provided with a backing bar (53) arranged beneath the conveyor belt (21).

7. Apparatus according to one of claims 1 to 6, characterised in that pneumatic piston-cylinder units (49) for raising and lowering the pressure bar (51) have their piston rods (48) secured to the carriage (46).

8. Apparatus according to one of claims 1 to 7, characterised in that the carriage (46) can be moved so far towards the stacking station that the pressure bar (51) is lowerable in this position onto the leading region of the stack that has been pushed off and is still suspended from the needles.

* * * * *